(12) United States Patent
Hsieh et al.

(10) Patent No.: US 9,322,328 B2
(45) Date of Patent: Apr. 26, 2016

(54) INTERNAL COOLING PASSAGE STRUCTURE FOR ROTARY ENGINE

(71) Applicant: Chung-Shan Institute of Science and Technology, Armaments Bureau, M.N.D, Taoyuan County (TW)

(72) Inventors: Ming-Chun Hsieh, Taoyuan County (TW); Dun-Zen Jeng, Taoyuan County (TW); Chih-Chuan Lee, Taoyuan County, MA (US); Ting-Hua Chieh, Taoyuan County (TW)

(73) Assignee: CHUNG-SHAN INSTITUTE OF SCIENCE AND TECHNOLOGY, ARMAMENTS BUREAU, M.N.D, Taoyuan County (TW)

( * ) Notice: Subject to any disclaimer, the term of this patent is extended or adjusted under 35 U.S.C. 154(b) by 105 days.

(21) Appl. No.: 14/213,210

(22) Filed: Mar. 14, 2014

(65) Prior Publication Data

US 2015/0260090 A1 Sep. 17, 2015

(51) Int. Cl.
| | |
|---|---|
| *F03C 2/00* | (2006.01) |
| *F03C 4/00* | (2006.01) |
| *F04C 2/00* | (2006.01) |
| *F02B 55/06* | (2006.01) |
| *F02B 55/12* | (2006.01) |
| *F04C 29/04* | (2006.01) |
| *F01C 21/06* | (2006.01) |
| *F01P 1/04* | (2006.01) |
| *F02B 53/00* | (2006.01) |

(52) U.S. Cl.
CPC ............... *F02B 55/06* (2013.01); *F01C 21/06* (2013.01); *F01P 1/04* (2013.01); *F02B 55/12* (2013.01); *F04C 29/04* (2013.01); *F02B 2053/005* (2013.01)

(58) Field of Classification Search
CPC .... F02B 53/00; F02B 53/06; F02B 2053/005; F02B 55/06; F04C 29/04; F01C 21/06; F01B 1/04
USPC ...................... 418/61.2, 85, 91, 101; 123/200
See application file for complete search history.

(56) References Cited

U.S. PATENT DOCUMENTS

| | | | | |
|---|---|---|---|---|
| 3,102,682 | A * | 9/1963 | Paschke ................... | F02B 55/04 418/61.2 |
| 3,234,922 | A * | 2/1966 | Froede .................... | F02B 55/12 418/101 |
| 3,298,330 | A * | 1/1967 | Ito ........................... | F02B 53/04 418/61.2 |
| 3,680,988 | A * | 8/1972 | King ........................ | F02B 55/04 418/61.2 |
| 4,898,522 | A * | 2/1990 | Edelmayer .............. | F02B 55/04 418/61.2 |

* cited by examiner

*Primary Examiner* — Theresa Trieu
(74) *Attorney, Agent, or Firm* — Chun-Ming Shih

(57) ABSTRACT

An internal cooling passage structure for rotary engine, which includes a rotary engine body, having a front frame, a mid-frame, a rear frame and a rotor, wherein the rotor has cooling passages beneath the rotor triangular apexes, and both front and rear frames respectively have corresponding openings; a rotor, rotating in the mid-frame, having the core cooling passages in full or partial connection with the openings in both front and rear frames in the engine operation; and a guide vane along the opening edge, wherein external air is guided into the rotor core cooling passages by the guide vane which avoids generating heat vortices and helps to increase the cooling air so as to lower the temperature on the rotor and its assemblies.

3 Claims, 7 Drawing Sheets

INTERNAL COOLING PASSAGE STRUCTURE FOR ROTARY ENGINE

BACKGROUND OF THE INVENTION

1. Field of the Invention

The present invention relates to an internal cooling passage structure for rotary engine, and more particularly, to a rotary engine, which has a device that increases the cooling air into the inner passage in the rotor core, and lower down the temperature of the rotor core and rotor assemblies during the operation by a guide vane.

2. Description of the Related Art

The engine cooling system of a piston engine or a rotary engine can be categorized into two types based on the heat load. They are air-cooling system and liquid-cooling system (water-cooling or oil-cooling). FIG. 1 illustrates the rotary engine assembly.

As shown, there is a plurality of heat fins mounting on edges of the rotor engine for exhausting the temperature generated by the rotor engine operated, and one side of the rotor engine has a cooling channel, which is used to increase the inner cooling air of the rotor engine. Additionally, the inner temperature of the rotor engine is exhausted by the cooling channel. However, there is a plurality of reinforcing ribs mounting on the cooling channel. Thereby, the cooling air is barred to flow into the inner of rotor engine due to the reinforcing ribs when flowing into the cooling channel of the conventional rotor engine. Or the design way of cooling channel allows the cooling air to generate the heat vortex phenomenon in the inner of the cooling channel, resulting in the external cooling air can not enter into the inner of the rotor engine and the temperature can not be exhausted from the inner of the rotor engine.

For the reason that the conventional method and device could not effectively solve the mentioned problems, a need has arisen to propose an internal cooling passage design for the rotary engine with a proper guide vane to diminish the vortices at the rotor core cooling openings in the front frame or rear frame and therefore more air is inducted into rotor core passages for a better cooling.

SUMMARY OF THE INVENTION

In view of the disadvantages of conventional techniques described above, the main object of the present invention is to provide a device in the internal cooling passage of the rotary engine, which uses a guide vane to increase cooling air into the rotor core cooling passage so as to lower the temperature in the rotor core and its assemblies during the engine operation. The guide vane is alternative in scale or shape on the basis of the engine requirements.

Another object of the present invention is to enhance the rotor core cooling efficiency so as to improve the engine efficiency and the life cycle under a better heat dissipation.

For achieving the object above, an internal cooling passage structure for rotary engine is disclosed according to one embodiment of the present invention. The internal cooling passage structure for rotary engine comprises: a rotary engine with a front frame, a mid-frame, a rear frame, a rotor and a guide vane. For the engine core cooling, there are dual rotor core cooling passage inlets on the front frame in correspondent to the dual core cooling passage exits on the rear frame. Three rotor core passages are beneath the three apexes of the triangular rotor. A guide vane in the front frame diminishes the vortices generated at the core cooling passage inlets to reduce the blockage and increase the cooling air mass so as to lower the rotor temperature for a stable engine operation.

BRIEF DESCRIPTION OF THE DRAWINGS

The invention, as well as its many advantages, may be further understood by the following detailed description and drawings in which.

DETAILED DESCRIPTION OF THE INVENTION

Figure 2:
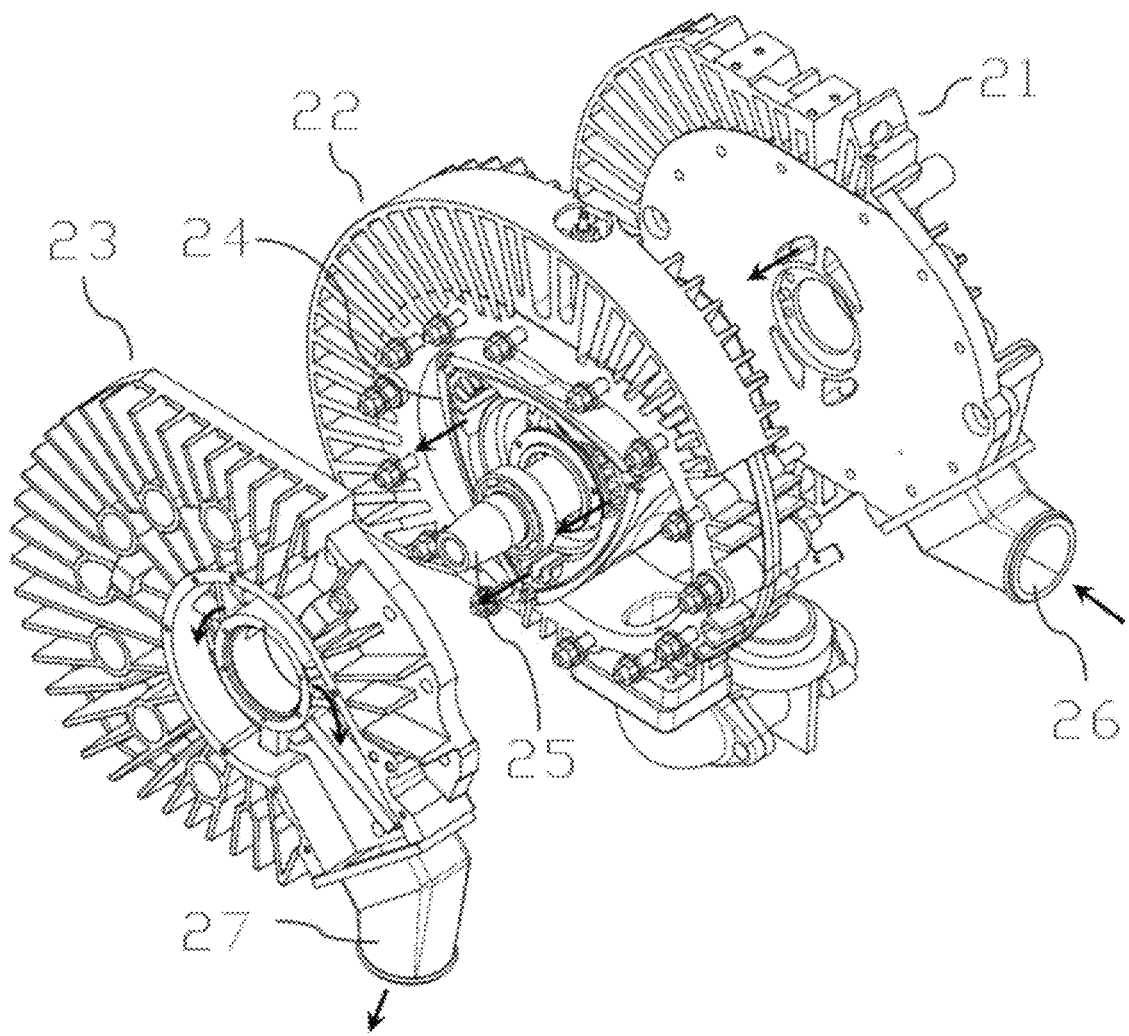

FIG. 2 illustrates each components and marks for the engine core cooling flow direction through the vent of each parts. As shown, to the engine core cooling, the air is inducted from core cooling intake duct 26 into the front frame 21 vent with openings on the side wall as rotor core cooling passage inlet, and the cooling air goes through the rotor 24 core cooling passages to the rear frame 23 openings, in location corresponding to the front frame's, into the rear frame 23 and the to the core cooling exhaust duct to expel the heat air.

Figure 3:
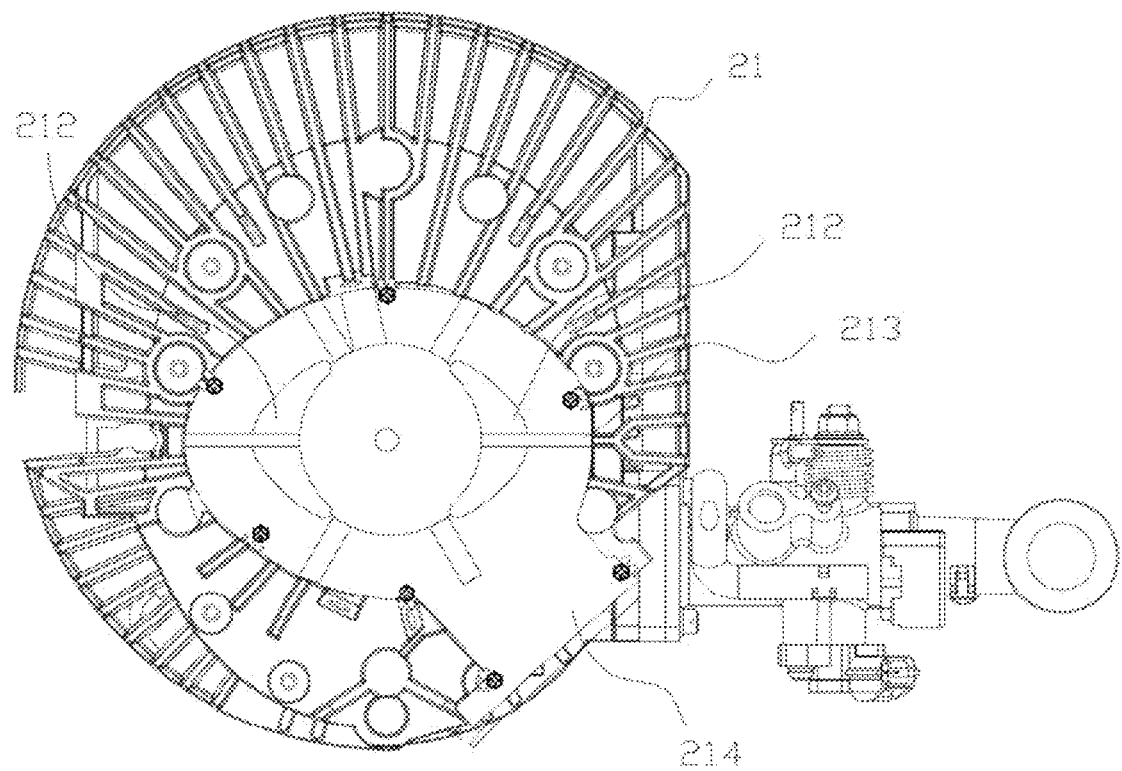
FIG. 3 illustrates the internal cooling structure of a conventional front frame.
Figure 4:
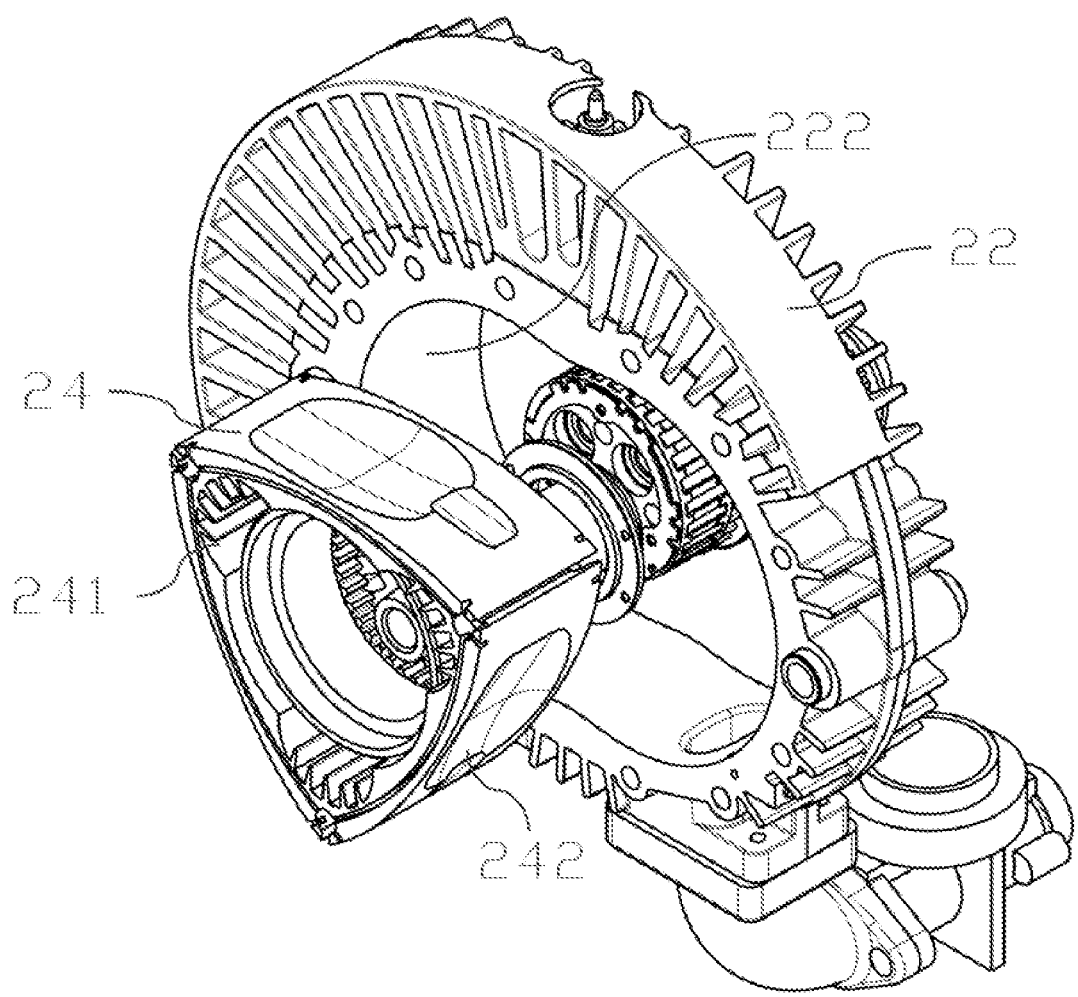
FIG. 4 illustrates the mid-frame and the rotor.

Referring to FIG. 3, to the inner cooling or rotor core cooling, a vent in the front frame 214 inducts the cooling air into rotor core cooling passage through the openings 212. As shown, there is a structured rib 213 cross each of the openings 212, and that structured rib blocks some of the cooling air into the core cooling passages 241 in FIG. 4. Due to the rib 213 or the front vent design, vortices appear at the core cooling openings 212 and lead to a poor heat dissipation.

Figure 7:
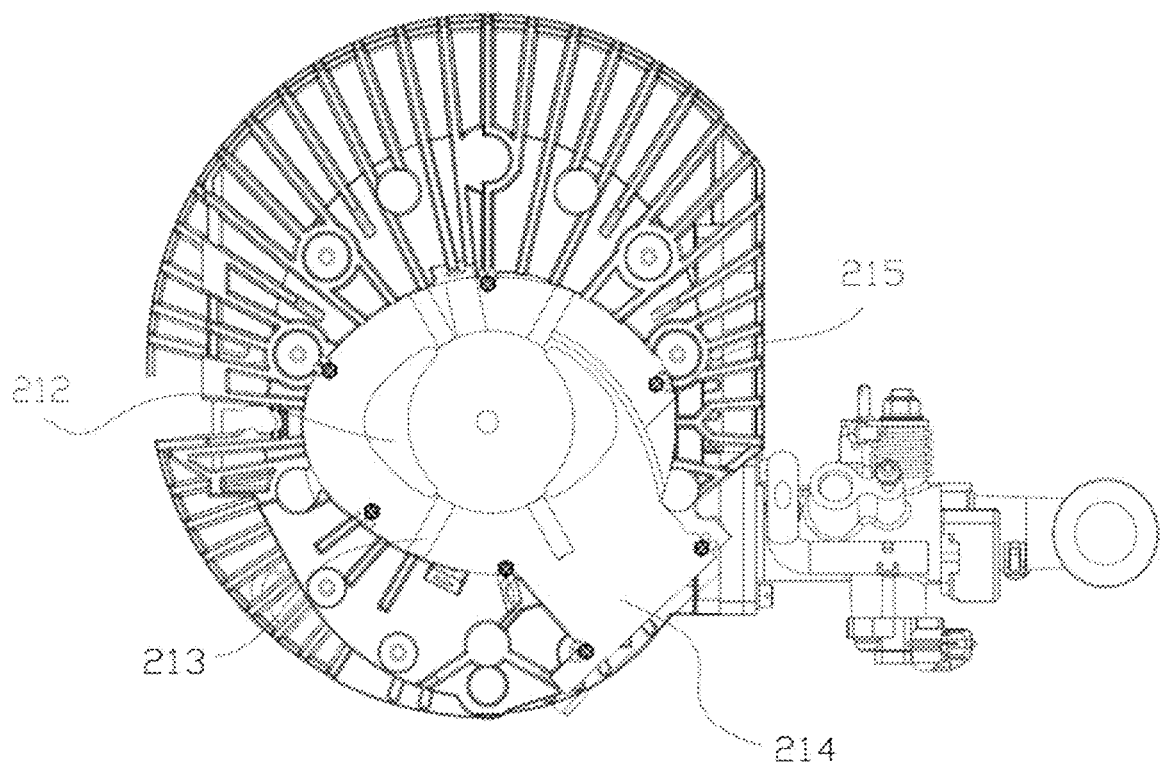
FIG. 7 illustrates a schematic diagram of the guide vane structure in the front frame

With reference to FIG. 7, which is a diagram of the guide vane structure on the front frame of a rotary engine of the present invention, the present invention contains a front frame 21, and a guide vane 215.

Figure 1:
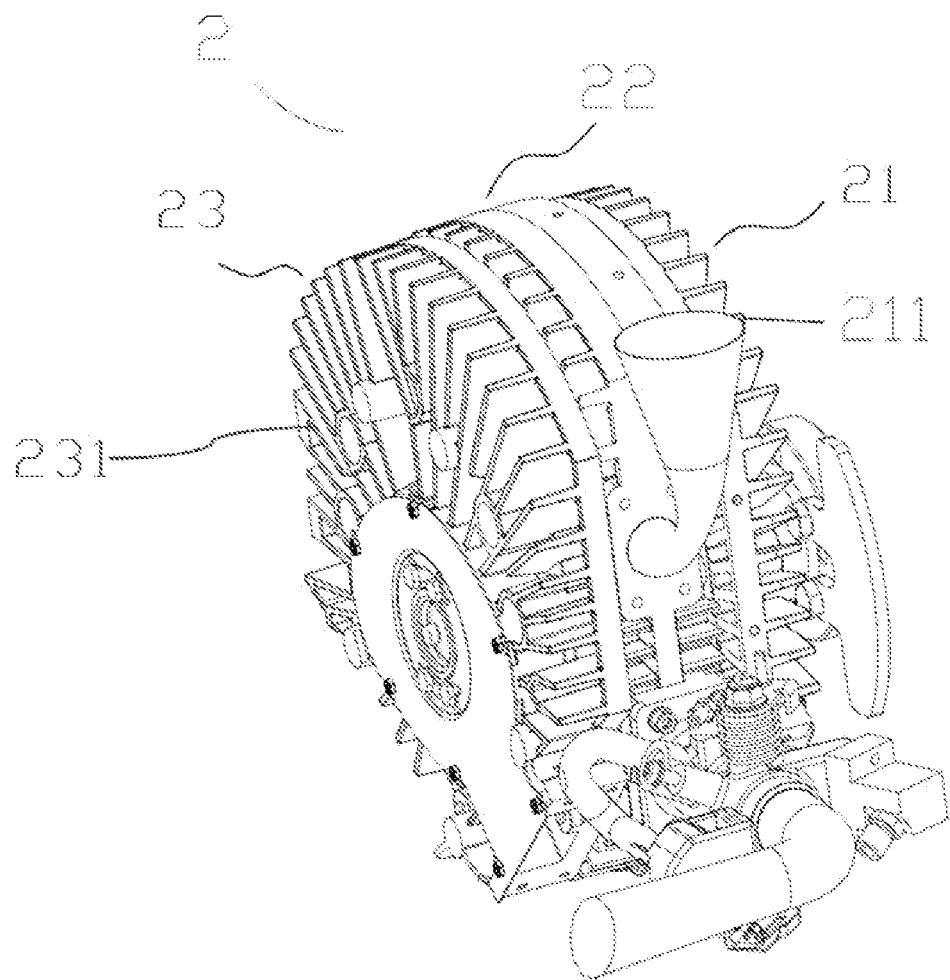
FIG. 1 and FIG. 2 illustrate the assembly and components of a conventional rotary engine.
Figure 5:
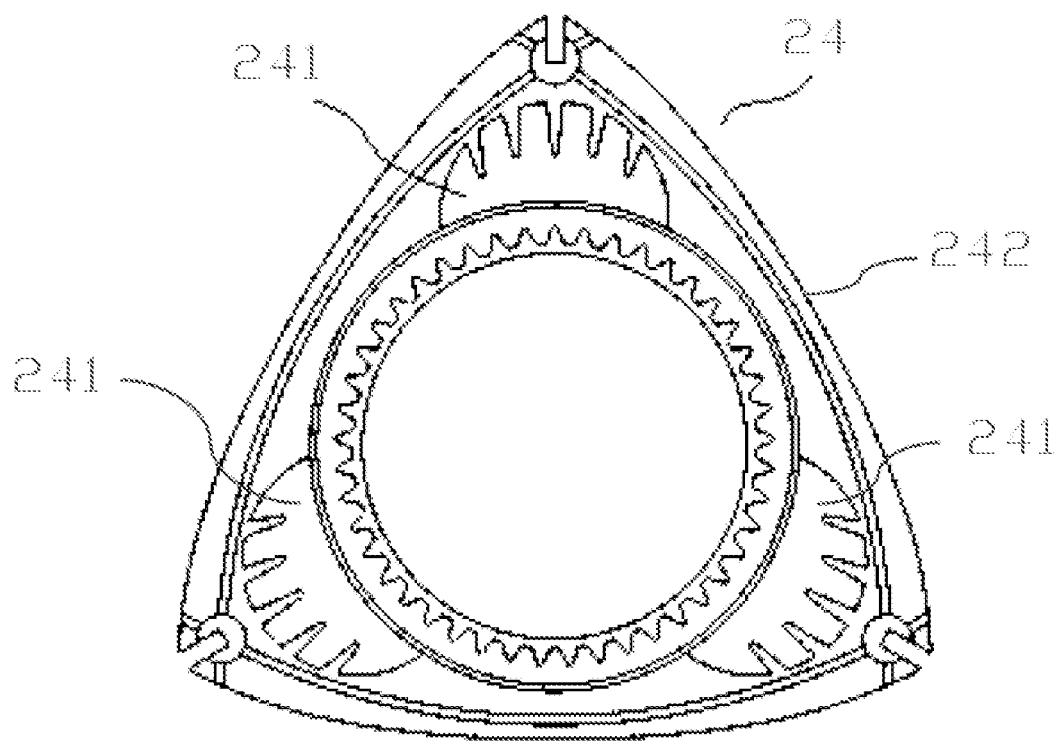
FIG. 5 illustrate a structure schematic diagram of the rotor.
Figure 6:
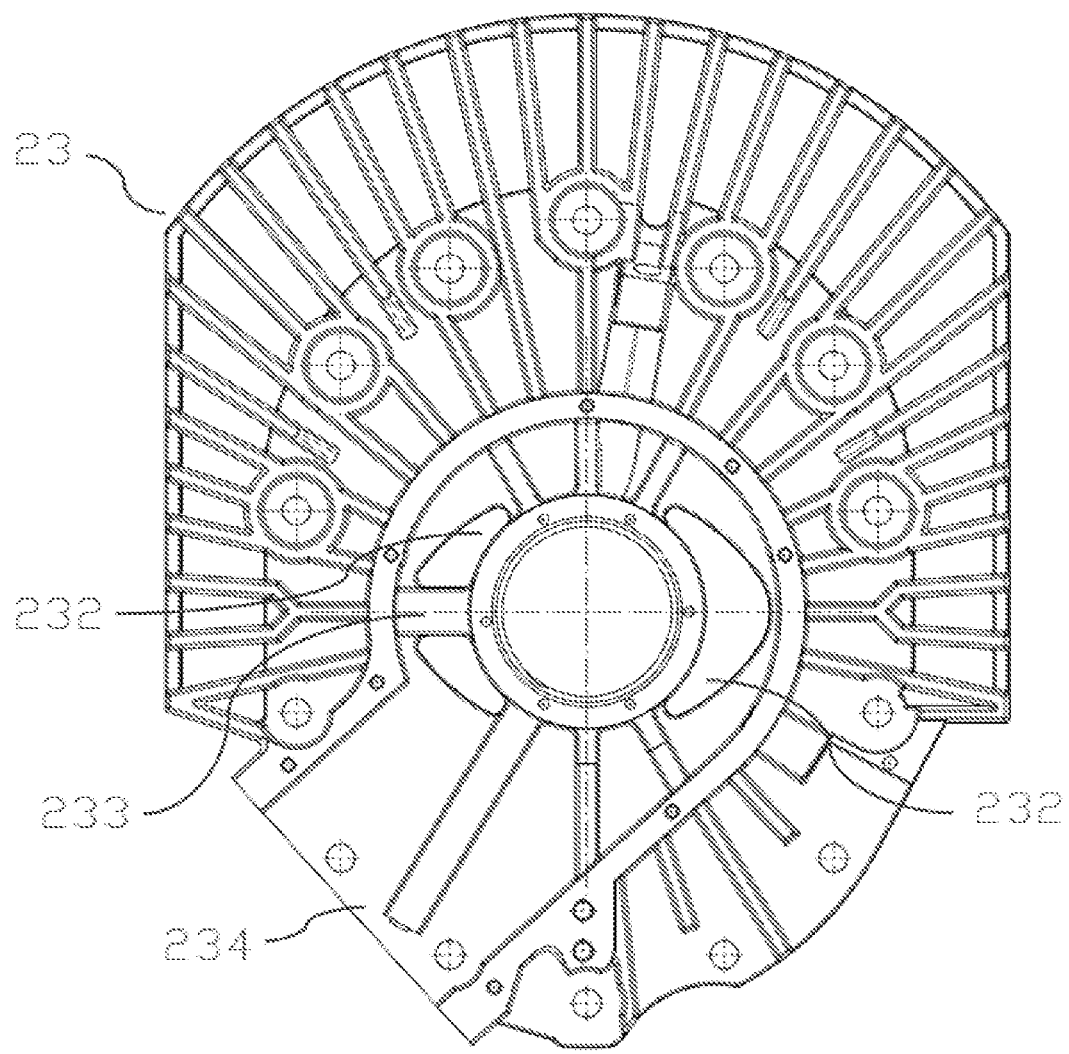
FIG. 6 illustrates a schematic diagram of the internal cooling passage structure in the rear frame.

Referring to FIG. 1, the rotary engine assembly 2 has a front frame 21, a mid-frame 22 and a rear frame 23, and there are cooling fins 211 and 231 circumferentially-aligned on the housings. As shown in FIG. 3, the front frame 21 has two openings 212 on both left and right as the rotor core cooling passage inlets, and the rear frame 23 in FIG. 6 also has two openings in corresponding to those on the front frame as the rotor core cooling passage exits. Referring to FIG. 5, the rotor 24 with three passages 241 beneath the triangular apexes rotates in the mid-frame eccentrically to the center crank shaft 25, and the time-variable space between the rotor edge 242 and mid-frame inner wall 222 forms the chamber for compression and combustion. The rotor edge 242 suffers high temperature from combustion and conduct the heat to the gear, and if the heat stays high without proper dissipation, heat stress and deformation will potentially damage the engine and shorten the life. As shown in FIG. 2, external cooling air is inducted from core cooling intake duct 26 into the front frame, and through the openings 212 into rotor core passages 241, then to the rear frame core cooling vent exit 234, and exhausted through the exhaust duct 27. Referring to FIG. 3, the cooling air from core cooling intake duct into the front frame 21 flows circumferentially to the openings 212, and a structured rib 213 cross each of the openings blocks the cooling air flow and generates vortices. Referring to FIG. 6, the same phenomenon may happen at the rear frame opening 232 with a rib 233 due to poor air flow path design. Referring to FIG. 7, which is the schematic diagram of the internal cooling passage structure in the front frame for the rotary engine of the present invention. As shown, a guide vane 215 is set along the opening 212 edge to smoothly guide the cooling flow into the rotor core passage 241, and the cross-ribs on both openings are removed for less blockage. Therefore, more cooling air is inducted into the rotor core passage so as to lower the temperature of the rotor and the gear during the operation.

Preferably, the guide vane 21 is designed according to the rotary engine category. Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An internal cooling passage structure for a rotary engine, comprising:
   a rotary engine body, having a front frame, a mid-frame and a rear frame, wherein the front and rear frames respectively have corresponding openings;
   a rotor, rotating in the mid-frame, having core cooling passages respectively beneath rotor triangular apexes, in full or partial connection with the corresponding openings in the front and rear frames in engine operation; and
   a guide vane attached to a structural rib of the front frame and set along an outside edge of an opening in the front frame, wherein external air is guided into the core cooling passages by the guide vane which avoids generating heat vortices and helps to increase cooling air so as to lower the temperature of the rotor.

2. The internal cooling passage structure for rotary engine of claim 1, wherein the front frame further has a vent inlet and the rear frame has a vent outlet.

3. The internal cooling passage structure for rotary engine of claim 2, wherein the guide vane extends to the inlet vent.

\* \* \* \* \*